United States Patent

Preker

[11] Patent Number: 6,092,453
[45] Date of Patent: Jul. 25, 2000

[54] BRAKE SERVO UNIT AND METHOD ASSEMBLING SAID UNIT

[75] Inventor: Gerd Preker, Koblenz, Germany

[73] Assignee: Lucas Industries public limited company, United Kingdom

[21] Appl. No.: 09/077,678

[22] PCT Filed: Dec. 9, 1996

[86] PCT No.: PCT/EP96/05498

§ 371 Date: Jun. 3, 1998

§ 102(e) Date: Jun. 3, 1998

[87] PCT Pub. No.: WO97/21572

PCT Pub. Date: Jun. 19, 1997

[30] Foreign Application Priority Data

Dec. 8, 1995 [DE] Germany ............................ 195 45 947

[51] Int. Cl.[7] .................................................... F15B 9/10
[52] U.S. Cl. ........................................ 91/369.1; 91/369.2
[58] Field of Search ............................... 91/369.1, 369.2; 90/407.01, 407.05, 407.08

[56] References Cited

U.S. PATENT DOCUMENTS

| | | |
|---|---|---|
| 3,807,280 | 4/1974 | Green et al. . |
| 5,016,520 | 5/1991 | Gautier . |
| 5,233,905 | 8/1993 | Fecher .................................... 91/369.1 |
| 5,293,808 | 3/1994 | Rueffer et al. . |
| 5,452,644 | 9/1995 | Bauer et al. . |
| 5,518,305 | 5/1996 | Jakobi et al. . |

FOREIGN PATENT DOCUMENTS

| | | |
|---|---|---|
| 2163 587 | 12/1971 | Germany . |
| 39 39 499 A1 | 11/1989 | Germany . |
| 39 41 604 A1 | 12/1989 | Germany . |
| 690 00 646 T2 | 4/1990 | Germany . |
| 41 24 518 A1 | 7/1991 | Germany . |
| 42 08 384 A1 | 3/1992 | Germany . |
| 43 17 490 A1 | 5/1993 | Germany . |
| 2074270 | 4/1981 | United Kingdom . |

*Primary Examiner*—Edward K. Look
*Assistant Examiner*—Hermes Rodriguez
*Attorney, Agent, or Firm*—MacMillan, Sobanski & Todd, LLC

[57] ABSTRACT

A brake booster operated, in particular, by a vacuum has an input member (32), into which an actuating force is introduced, and an output member (42) for emitting an increased force to a downstream subassembly, for example a master cylinder (12). Since each component of the brake booster (10) has a tolerance range, length tolerances necessarily occur along the actuating travel, and these have an undesirable influence on the characteristic of the brake booster and therefore have to be eliminated or at least reduced. In order to avoid a series of sensing disks (36) and distance disks (62) of different thicknesses having to be kept ready for length compensation, it is proposed to calibrate the length of the input member (32) and/or of the output member (42) by the compressive forming of the latter to a desired length which is obtained from a comparison between an actual dimension and a desired dimension, and then to install said member in the brake booster (10).

15 Claims, 4 Drawing Sheets

BRAKE SERVO UNIT AND METHOD ASSEMBLING SAID UNIT

The invention relates to a brake booster according to the preamble of claim 1 and to a method of assembly for a brake booster.

Vehicle brake systems are nowadays, as a rule, equipped with a brake booster which, at least in the case of passenger cars, is usually designed as a vacuum brake booster and which serves for keeping the brake actuating force to be exerted by a driver at a comfortable, that is to say relatively low level. Such a brake booster consists of a multiplicity of individual parts, each of which has a tolerance range. It is therefore impossible to avoid length tolerances occurring in the brake booster along the actuating travel, these length tolerances having to be compensated in order to ensure a uniform characteristic in a series of brake boosters. Particularly critical in this respect is a dimension between an input member of the brake booster, said input member being designed, for example, as a valve piston, and a force transmission member which follows said input member in the actuating direction and which is often a disk made of elastomeric material and is then referred to as a reaction disk. The abovementioned dimension between the input member and the reaction disk is also referred to by specialists as the z-dimension. This determines essentially the behavior of a brake booster in the initial phase of brake actuation, said behavior also being known as the lockin behavior. If the z-dimension is small, the vehicle brake system responds, in the case of a predetermined brake actuating force, to a lesser extent than if the z-dimension is larger. Even small changes in the z-dimension lead to detectable changes in the response behavior of the brake booster, which is why as good a compensation of tolerance as possible is desirable at this point, so that a required characteristic can also be maintained reliably in mass production.

Another important dimension occurs between the output member of a brake booster and a downstream subassembly, for example a brake master cylinder. Here too, the unavoidable length tolerances lead to greater or lesser idle travels which have an undesirable influence on the behavior of the brake system during actuation.

Two different methods have been proposed for achieving tolerance compensation, and both of these are used in practice. The first method establishes the deviation between an actual dimension and a desired dimension by measurements on the partly assembled brake booster and then, by using corresponding distance compensating pieces, for example distance disks, ensures that as close an approximation as possible to a predetermined desirable length is obtained. This presupposes that the distance compensating pieces, disks, rings or the like, are available in a relatively large number of graded sizes. It is nevertheless only ever possible to achieve an approximation to the desired dimension in this way. Furthermore, installing these distance compensating means during the assembly of a brake booster is time consuming and therefore costly on account of the necessary checks of the installed thicknesses and, if appropriate, also of the installation position. If a plurality of distance disks or rings have to be used, the unavoidable waviness of these parts may also result in a spring system which, in turn, has an undesirable influence on the characteristic of the brake booster or the brake system.

The second method is to design specific parts so as to be adjustable in length along the actuating travel of the brake booster, so that a specific desired length can subsequently be set. Such a solution is known, for example, from DE 42 08 384 A1. So that the length of the component of variable length can be set, even when the brake booster is already installed in a vehicle, DE 43 17 490 A1 proposes a tubular sleeve with an extension which allows the sleeve and a part, coupled thereto, of a multipart valve piston to rotate.

The setting work to be carried out for distance compensation is likewise time consuming and, together with the price which in any case is higher for a component of adjustable length, has the effect of increasing the cost of the production of a brake booster.

The object on which the invention is based is to specify a brake booster, in which the length of the input member and/or the output member corresponds as exactly as possible to the required desired length. The object on which the invention is based is also to specify a method of assembly for a brake booster, which makes it possible cost effectively to produce a brake booster, the input member and/or output member of which correspond in length as exactly as possible to the required desired length.

This object is achieved, according to the invention, by means of a brake booster in which the length of the input member and/or the output member is calibrated to a desired length by the compressive forming of its material. In the brake booster according to the invention, therefore, the length of the input member and/or the output member is not simply approximated to the required desired length, but corresponds to the required desired length. This means that each brake booster of a series has an input member and/or an output member, the length of which is matched exactly to this one brake booster.

By compressive forming is meant, within the scope of the present invention, material forming by pressing or else by impact, which, particularly on the surface of the formed material portion, leads to material compaction and therefore to higher wear resistance. According to the invention, therefore, no material is removed from the input member or the output member, but, instead, the existing material is compressively formed in such a way that the desired calibration is achieved.

The abovementioned object is also achieved by means of a method of assembly for a brake booster. This method of assembly is suitable particularly for the calibration of metal parts, since the metal parts are upset in a defined manner by forming and thus brought to a dimension corresponding to the desired length. As compared with conventional methods of assembly for brake boosters, it is no longer necessary, in the method of assembly according to the invention, to keep distance compensating components of different dimensions in reserve, but the input member and/or the output member themselves are brought to exactly the required desired length in a calibrating station by compressive material forming as a function of the dimension determined for a specific brake booster. For this purpose, input members and/or output members, the length of which corresponds at least to a largest possible desired length, are provided. The calibrating station comprises a press, by means of which the forming of the corresponding part is carried out quickly and exactly.

In a preferred embodiment of the method of assembly according to the invention, the forming force is a function of the difference between the established actual dimension and the predetermined desired dimension.

It is particularly preferred for the input member and/or the output member of the brake booster to have a multipart design, so that only an end portion of the input member or of the output member has to be subjected to the calibrating operation. For example, the input member of the brake booster may be designed as an actuating or valve piston, of which the end portion facing the reaction disk is designed as a separate sensing disk. In that case, only this sensing disk needs to be calibrated. The output member of the brake booster may likewise be designed as a reaction piston, of which the free end, that is to say the end facing a master cylinder, is designed as a separate head part, so that only this head part needs to be calibrated.

The calibrating operation is preferably carried out in such a way that the shape of the free end of the input member or of the output member does not or, at all events, does not appreciably change. If, therefore, for example, that end of a sensing disk which faces the reaction disk or that end of the separate head part which faces the master cylinder has a specific shape, this shape is, as far as possible, not to be changed as a result of the calibrating operation. For forming, this means that the press ram impacting or pressing onto the part to be calibrated is shaped according to the shape of that end face of the part to be calibrated which faces said press ram.

Advantageously, in the method of assembly according to the invention, the calibrating station is designed in such a way that it automatically calibrates the input member and/or the output member to the desired length according to the difference between the actual dimension and desired dimension and subsequently makes said member available for installation. This can be achieved, for example, by connecting the calibrating station to a measuring device via a computing unit, so that the resulting data are available to said measuring device near the time of the measuring operation. The parts to be calibrated can, for example, be conveyed to the calibrating station by means of a vibrating conveyor and the calibrated parts can be transported out of the calibrating station, for example via a trough, to the place of assembly of the brake booster.

So that, in the case of a brake booster according to the invention, a separate end portion of the input member, said end portion being designed as a sensing disk, can be calibrated by forming, in particular upsetting, the sensing disk has at least one material cut-out which is arranged in such a way that a change in length of the sensing disk can be achieved by the forming of the latter, without the diameter of the sensing disk changing. Such a material cut-out preferably consists of an annular recess in the bottom of the sensing disk, into which recess the material can escape when the sensing disk is being compressed during the calibrating operation.

If, in a brake booster according to the invention, the output member is of multipart design, for example in the form of a reaction piston with a separate reaction piston head, then the head of the reaction piston preferably has a base which is designed as an annular collar and the diameter of which is larger than the diameter of the remaining portions of the head. This base is surrounded completely in the press during forming, so that no change in the diameter of the base can occur. Forces occurring during the forming operation can thus also be diverted radially at the same time, thereby avoiding the formation of cracks in the region of the base. Furthermore, the diameter of the annular collar sets a limit to the maximum permitted deformation, since forming of the head during calibration should not lead to the diameter of the remaining portions of the head being larger than the annular collar diameter after forming.

In general, therefore, in the brake booster according to the invention and in the method of assembly according to the invention, it is necessary to ensure that the calibration of the input member and/or of the output member of the brake booster takes place purely as a result of a change in length of the corresponding components, and that the diameter does not change at the same time. Only when it is unavoidable may the diameter change during the calibrating operation within exactly defined ranges which are noncritical for the functioning of the brake booster.

A preferred exemplary embodiment of a brake booster according to the invention and a method of assembly for this brake booster are explained in more detail below with reference to the accompanying Figures of which:

FIG. 1 shows a part section through a vacuum brake booster which has a separately designed sensing disk and a separate reaction piston head, FIG. 2 shows the side view of a noncalibrated reaction piston head, FIG. 3 shows the side view of the reaction piston head from FIG. 2 in a calibrated state which has been achieved by slight forming, FIG. 4 shows the side view of the reaction piston head from FIG. 2 in a calibrated state which has been achieved by maximum permitted forming, FIG. 5 shows a calibrating station for calibrating a reaction piston head according to FIG. 2 by forming, FIG. 6 shows, in section, a sensing disk designed for calibration by forming, and FIG. 7 shows a calibrating station for calibrating a sensing disk according to FIG. 6 by forming.

FIG. 1 shows a vacuum brake booster, designated in general by 10, for a vehicle brake system, said brake booster being followed by a brake master cylinder 12 which is designated below merely as a master cylinder.

The brake booster 10 has a housing 14 which is essentially rotationally symmetrical relative to an axis A and which is composed of two semimonocoque housing parts 16 and 18. A working chamber 20 and a vacuum chamber 22 are formed in the housing 14 by means of a movable wall 24 which separates the two chambers 20 and 22 from one anther in a gastight manner. In the operating state, the vacuum chamber 22 is constantly connected to a vacuum source, whilst the working chamber 20 can be connected selectively to the vacuum source or to atmospheric pressure. For this purpose, there is a control valve arrangement 26, the housing 28 of which is connected to the movable wall 24 for joint relative movement with respect to the housing 14 of the brake booster 10.

The end, designed spherically in the example shown, of a rod-shaped actuating member 30 acts on the control valve arrangement 26, the other end, not illustrated here, of said actuating member being connected to the brake pedal of the vehicle brake system. The actuating force exerted on the brake pedal by the driver when the brake system is actuated is introduced via the actuating member 30 into an input member 32 which is displaceable along the axis A and which, in the exemplary embodiment shown, consists of a valve piston 34 and of a separate sensing disk 36 adjoining the latter axially in the actuating direction.

The sensing disk 36 is in contact with a force transmission member which, in the exemplary embodiment illustrated, is formed by a reaction disk 38 made of an elastomeric material, which is received in an end recess 40 of the housing 28 of the control valve arrangement 26. An output member 42 adjoins the reaction disk 38 axially in the direction of actuation of the brake booster, said output member being formed, here, by a reaction piston 44 of T-shaped longitudinal section and by a separate reaction piston head 46 connected thereto and having a free hemispherical end 48.

When an actuating force is introduced via the actuating member 30 into the input member 32, the latter is displaced to the left in FIG. 1, with the result that a valve seat 50 designed on the valve piston 34 lifts off from a valve closing member 52 and a supply of atmospheric pressure into the working chamber 20 thereby becomes possible. At the same time, the sensing disk 36 penetrates into the elastomeric reaction disk 38. Due to the supply of atmospheric pressure into the working chamber 20, the movable wall 24, together with the housing 28 of the control valve arrangement 26, is displaced to the left and transmits an increased actuating force to the output member 42 which, in turn, transfers this force via the hemispherical end 48 of the reaction piston head 46 to a primary piston 54 of the master cylinder 12. A helical compression spring 56, which is clamped in the housing 14 of the brake booster 10, serves, after a braking operation has ended, for restoring the movable wall 24 into the initial position, represented in FIG. 1, in which the two chambers 20 and 22 are separated from one another by the control valve arrangement 26. The functioning and design of the brake booster 10 correspond thus far to conventional brake boosters of this type and therefore need not be explained any further.

A dimension important for the functioning of the brake booster 10, and which has an appreciable influence, in particular, on the response behavior of the brake booster, said behavior also being known as the lockin behavior, is the so called z-dimension evident from FIG. 1, that is to say the distance between the sensing disk 36 and the reaction disk 38. Vehicle manufacturers predetermine, for each vehicle model, a specific z-dimension, by means of which the brake booster characteristic desired by the vehicle manufacturer is achieved. In this case, a larger z-dimension stands for a rapid and vigorous response by the brake booster 10, whilst a smaller z-dimension (even z=0 is possible) has the opposite effect.

Another important functional dimension of the brake booster 10 is a dimension B likewise evident from FIG. 1, that is to say the distance between the end of the output member 42, said end being formed here by the hemispherical end 48 of the reaction piston head 46, and that face 58 of a fastening flange 60 of the master cylinder 12 which faces the brake booster 10. The axial position of the free hemispherical end 48 with respect to the abovementioned bearing face 58 critically determines, in the ready assembled state of the brake booster/master cylinder unit, the axial position of the primary piston 54 in the master cylinder 12 and consequently also the existing idle travel, that is to say the travel which the primary piston 54 has to execute in the longitudinal bore of the master cylinder 12 until a pressure build-up commences. Even the slightest differences in the axial position of the output member 42 have a clearly detectable effect, since, on account of the existing mechanical step-up, a given idle travel in the brake booster results in a correspondingly greater idle travel on the brake pedal.

Due to the unavoidable production tolerances of the parts of the brake booster 10, length tolerances occur along its actuating travel, and, when each brake booster 10 is being assembled, these would lead to a different z-dimension or a different dimension B. Before ultimate assembly, therefore, these length tolerances must be eliminated as far as possible, in order to ensure that the required z-dimension or the required dimension B and consequently the desired brake booster characteristic are maintained in each brake booster of a series. In the exemplary embodiment illustrated, this has been achieved hitherto, on the one hand, by providing sensing disks 36 of different thicknesses, so that a thicker or thinner sensing disk 36, depending on the resulting length tolerance, has been installed for compensating this length tolerance, in order to approximate as closely as possible to the required z-dimension. On the other hand, as is also evident from FIG. 1, one or more distance disks 62, likewise provided in different thicknesses, have been installed between the reaction piston 44 and the reaction piston head 46.

According to the invention, it is no longer necessary to provide distance disks 62 or sensing disks 36 of different thicknesses. Instead, the respective end portions of the input member 32 or of the output member 42, that is to say the sensing disk 36 and the reaction piston head 46, are provided in a length which is sufficient for achieving at least the maximum desired length necessary in each case for the input member (32) or the output member 42. The sensing disk 36 and the reaction piston head 46 are then subjected, in a press, to material forming which leads to a length reduction. In this case, the length reduction takes place as a function of the previously ascertained length tolerances of a specific brake booster 10, only in so far as exactly the desired dimension B or the required z-dimension is established after the reaction piston head 46 or sensing disk 36 reduced in length by material forming has been installed. The forming operation proceeds continuously, in that a drive motor of the press rotates a press spindle under travel-dependent control. After the predetermined length reduction has been reached, this being detected by travel measurement, the drive motor is stopped.

The following procedure is adopted for assembling the brake booster 10: in the first place, the control valve arrangement 26, without sensing disk 36, reaction disk 38 and reaction piston 44, is inserted into the semimonocoque housing part 18 of the brake booster housing 14, said housing part being on the right in FIG. 1, and is clamped in a holding fixture not illustrated in any more detail. The axial distance between the valve piston 34 and a first reference face 64 is then determined by means of a measuring device. This dimension constitutes the actual dimension, from which the necessary desired length of the sensing disk 36 is obtained by subtracting the predetermined z-dimension that constitutes the desired dimension. Thereupon, in a calibrating station explained in more detail later, the length of a sensing disk 36 is reduced by pressing, in such a way that it is identical to the desired length previously determined. The sensing disk 36 thus calibrated is then made available for installation in the brake booster 10.

In the exemplary embodiment illustrated, the input member 32 is of two-part design. This makes it easier to calibrate, since only its end portion in the form of the sensing disk 36 has to be calibrated. However, it is also possible to design the input member 32 as one part and to calibrate it to the desired length in a suitable press station.

The output member 42 is also calibrated in a similar way. For this purpose, in the first place, after the installation of a calibrated sensing disk 36 has taken place, the reaction disk 38 and the reaction piston 44 are installed, the latter being secured on the housing 28 of the control valve arrangement 26 by means of a holding and guiding clip 66. The housing 14 of the brake booster 10 is subsequently completed by connecting the semimonocoque housing part 16 on the left in FIG. 1 to the right housing part 18, and the unit thus obtained is clamped, in turn, in a holding fixture not illustrated in any more detail. The distance between the free end of the reaction piston 44 and a second reference face 68 on the outside of the housing part 16 is determined by means of a measuring device, the face 58 of the fastening flange 60 of the master cylinder 12 bearing on the said reference face when the brake booster/master cylinder unit is assembled. This dimension designated by $B_o$ constitutes the actual dimension, from which the required desired length for the reaction piston head 46 is obtained by subtracting the predetermined desired dimension B. Thereupon, in a further calibrating station, the design of which is likewise explained in more detail later, a reaction piston head 46 is reduced in length by pressing, in such a way that it has the desired length previously determined. The calibrated reaction piston head 46 is then connected to the reaction piston 44, thereby concluding the assembly of the brake booster 10.

The design of the reaction piston head 46 to be calibrated by pressing emerges from FIGS. 2 to 4, whilst FIG. 5 shows a press which serves for forming the reaction piston head 46 and which is part of an automatic calibrating station.

FIG. 2 shows the reaction piston head 46 in a state prior to forming, that is to say in the state in which it is fed to the press and in which it has a length L which corresponds at least to the greatest possible desired length. For connection to the reaction piston 44, the reaction piston head 46 has a cylindrical slotted extension 70 of smaller diameter, having a bevelled end 72, by means of which it can be introduced into a corresponding recess of the reaction piston 44. The slotted design of the extension 70 ensures a resiliently clamping fit in the reaction piston 44.

Figure 1:
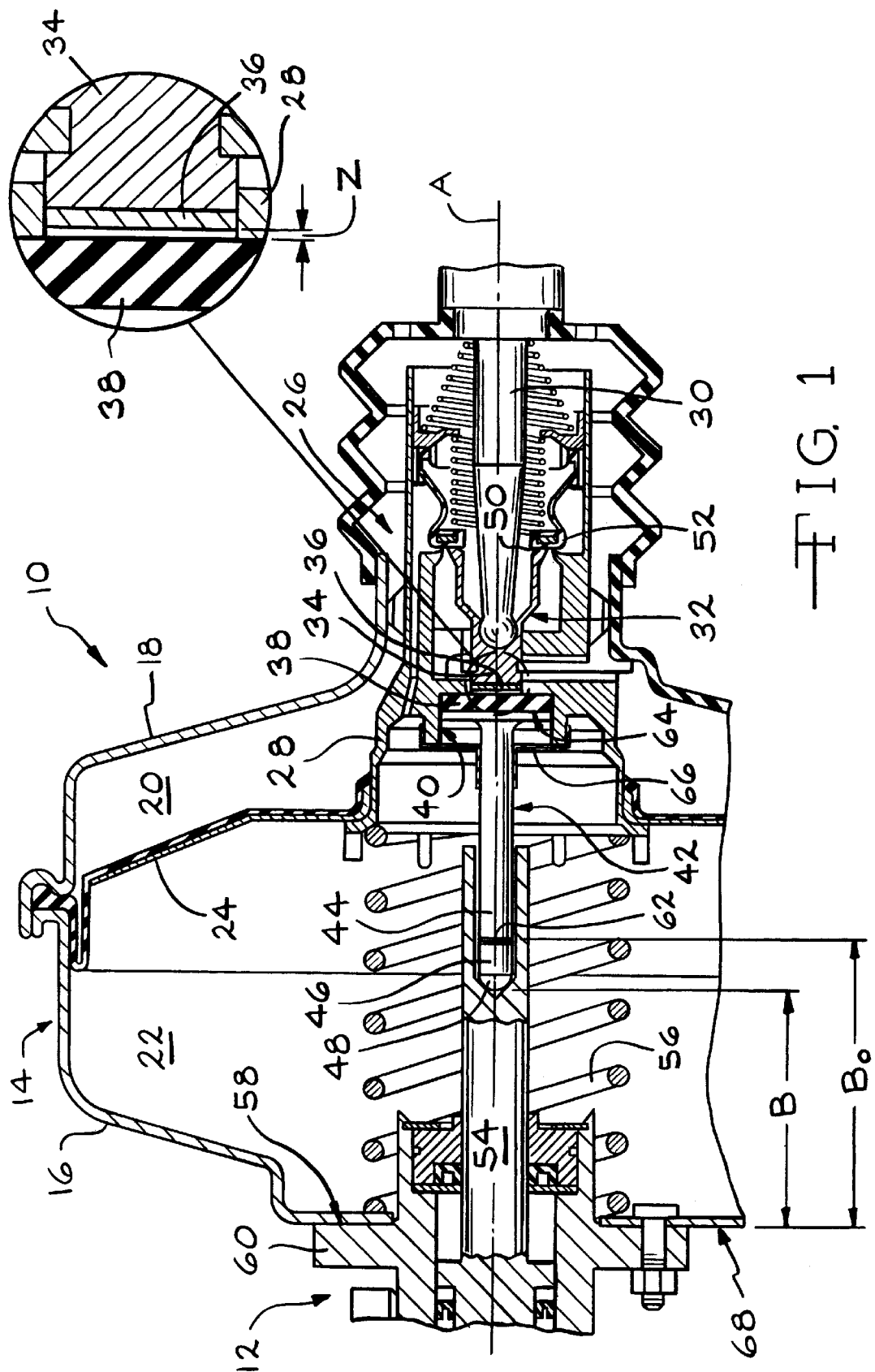
Figure 2:
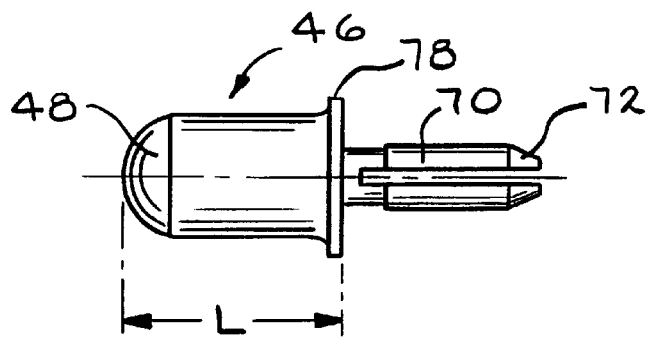
Figure 3:
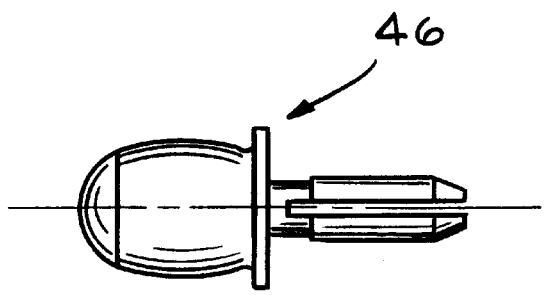
FIG. 3 shows a reaction piston head 46, the original length L of which has been somewhat reduced in the axial direction by pressing. The pressing operation leads to a bulge of material in the middle portion of the reaction piston head 46.
Figure 4:
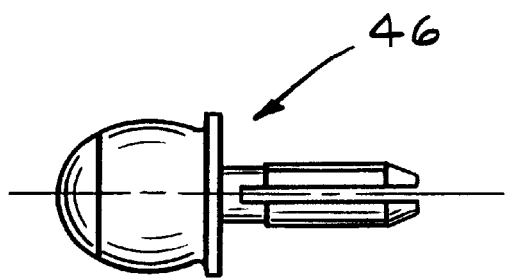
FIG. 4 shows a reaction piston head 46, the original length L of which has been reduced to a greater extent, as compared with the state shown in FIG. 3, by means of compressive forming, thus leading to a correspondingly larger bulge of material in the middle portion of the reaction piston head 46.
Figure 5:
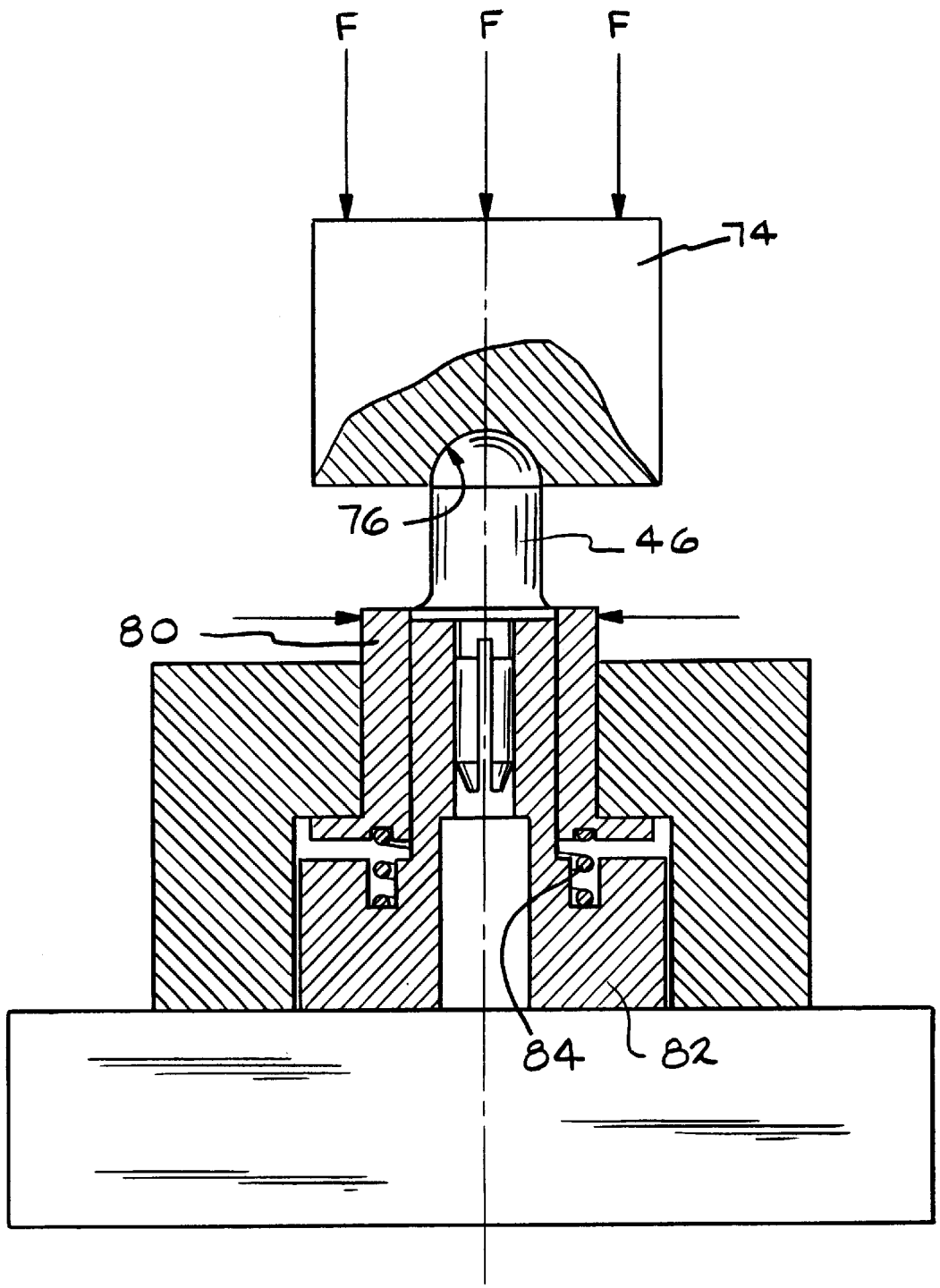

As may be seen from FIGS. 3 and 4, the shape of the hemispherical end 48 of the reaction piston head 46 is not changed during pressing. So that the shape of the end 48 remains unchanged, the press ram 74 of the press illustrated in FIG. 5 is designed with a corresponding cup-shaped depression 76, so that the forming force can be introduced into the reaction piston head 46, without the hemispherical head shape changing. In order, furthermore, to prevent the forming of material in an uncontrolled way during the operation of pressing or upsetting the reaction piston head 46, the base of the head 46 is designed as a radially outwardly projecting annular collar 78 of larger diameter. In the press, this annular collar 78 is surrounded completely and closely by a protective cylinder 80 during the pressing operation, whilst the underside of the head 46 is supported by a press holder 82.

After the pressing and calibrating operation has ended, the press holder 82 is moved upward counter to the force of a spring 84 and thus presses the annular collar 78 out of the protective cylinder 80. Thus, during the forming operation in the press, a forming of the material of the reaction piston head 46 takes place only in a specific region between the hemispherical end 48 and the annular collar 78. At the same time, the pressing force introduced into the reaction piston head 46 consisting of metal leads to compaction of the material at the hemispherical end 48 and consequently to increased wear resistance in this region.

Figure 6:
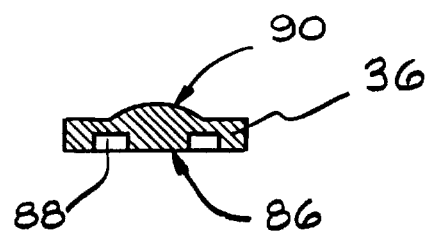

FIG. 6 shows a sensing disk 36 which is suitable for being reduced in length by introducing an axial pressing force. The sensing disk 36 has, in its bottom 86, an annular recess 88 of rectangular cross section, into which material can be displaced during the forming operation. Instead of a circular recess, one or more recesses of another shape may also be provided, the only important thing being that the material of the sensing disk 36, which likewise preferably consists of metal, can be displaced into these recesses, and these recesses should not impair the sensing disk stability necessary for the intended use.

Figure 7:
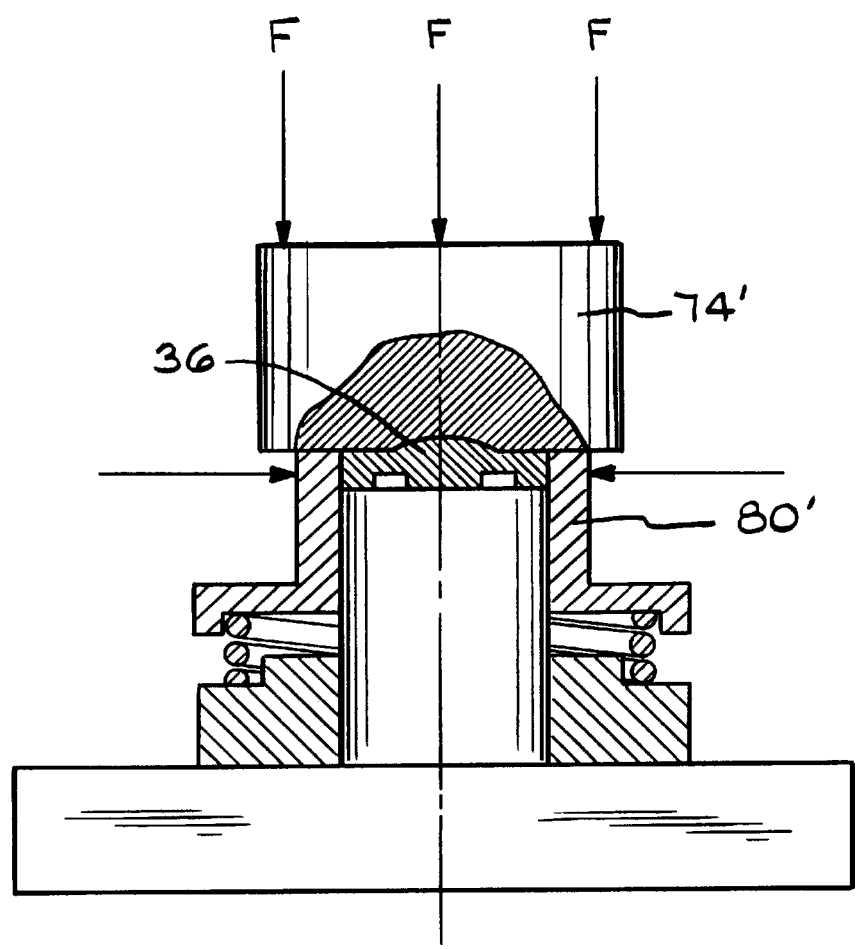

FIG. 7 illustrates a second press, by means of which the forming of the material of the sensing disk 36 can be carried out, said forming being necessary for length adaption. In the case of the sensing disk 36 too, it is important that neither the sensing disk diameter nor the shape of the sensing disk face facing the reaction disk 38 change. In the present case, for example, the sensing disk has, on its face facing the reaction disk 38, a lenticular elevation 90 which, when the brake is actuated, penetrates first into the reaction disk 38 and thus leads at the commencement of braking to a greater step-up ratio. The press ram 74 is therefore provided with a corresponding recess, so that the lenticular elevation 90 remains unchanged. In a similar way to the press for the reaction piston head 46, the press for the sensing disk 36 also has a protective cylinder 80 which, during the pressing operation, closely surrounds the sensing disk and prevents the diameter of the latter from changing.

The presses shown in FIGS. 5 and 7 are part of a calibrating station for the automatic calibration of the reaction piston head 46 and of the sensing disk 36. The two presses are connected electronically to the associated measuring devices and to a computing unit, so that, in each case, a reaction piston head 46 or sensing disk 36 adapted in length to a specific brake booster can be produced without any disturbing time delay. The uncalibrated reaction piston heads and sensing disks are made available to the presses by means of an automatically feeding vibrating conveyor and, after calibration has taken place, are brought likewise automatically to the place of assembly of the brake booster by means of a transport system. Highly cost effective, fault free and, above all, low-tolerance production of brake boosters is thereby possible.

What is claimed is:

1. Brake booster comprising an input member, into which an actuating force is introduced, and with an output member for transmitting an increased force to a downstream subassembly, with at least one of the input member and output member having a portion formed by compressive forming, a whereby the portion is calibrated to a desired length by the compressive forming of its material.

2. Brake booster according to claim 1, characterized in that the output member is multipart and only a separate end portion of the output member has been subjected to compressive forming.

3. Brake booster according to claim 1, characterized in that the input member is multipart and only a separate end portion of the input member has been subjected to compressive forming.

4. Brake booster according to claims 3, characterized in that the output member is multipart and only a separate end portion of the output member has been subjected to compressive forming.

5. Brake booster according to claim 3, characterized in that the end portion of the input member is a sensing disk.

6. Brake booster according to claim 5, characterized in that the sensing disk has at least one material cut-out which allows a change in length of the sensing disk by the compressive forming of the latter, without a simultaneous change in diameter.

7. Brake booster according to claim 6, characterized in that the material cut-out is an annular recess in the bottom of the sensing disk.

8. Brake booster according to claim 4, characterized in that the end portion of the output member is the head of a reaction piston.

9. Brake booster according to claim 8, characterized in that the head of the reaction piston has a base which is designed as an annular collar and the diameter of which is larger than the diameter of the remaining portions of the head.

10. Method of assembly for a brake booster, the brake booster having an input member, into which an actuating force is introduced, an output member, via which an increased force is emitted to a downstream subassembly, and a force transmission member arranged between the input member and the output member, with the steps:

provision of an input member and/or an output member, the length of which corresponds at least to a greatest possible desired length, in a calibrating station;

ascertainment of an actual dimension between the input member and the force transmission member and/or between the output member and a reference face on the brake booster;

comparison of each ascertained actual dimension with a corresponding predetermined desired dimension for determining the desired length of the input member and/or of the output member;

calibration of the input member and/or of the output member to the specific desired length by compressive forming in the calibrating station; and installation of the calibrated input member and/or output member in the brake booster.

11. Method of assembly according to claim 10, characterized in that the forming force is in each case a finction of the difference between the ascertained actual dimension and the predetermined desired dimension.

12. Method of assembly according to claim 10, characterized in that the compressive forming operation in the calibrating station takes place under travel control and is monitored continuously by means of travel measurement.

13. Method of assembly according to claim 10, characterized in that the input member and/or the output member are/is multipart, and in that only an end portion of the input member or of the output member is subjected to the calibrating operation.

14. Method of assembly according to claim 10, characterized in that the shape of a free end of the input member or of the output member does not or at least does not appreciably change as a result of the calibrating operation.

15. Method of assembly according to claim 10, characterized in that the calibrating station automatically calibrates the input member and/or the output member to the desired length according to the difference between the actual dimension and desired dimension and subsequently makes said member available for installation.

* * * * *